US012265606B2

(12) United States Patent
Lin et al.

(10) Patent No.: US 12,265,606 B2
(45) Date of Patent: Apr. 1, 2025

(54) DIRECT ASSIGNMENT OF PHYSICAL DEVICES TO CONFIDENTIAL VIRTUAL MACHINES

(71) Applicant: Microsoft Technology Licensing, LLC, Redmond, WA (US)

(72) Inventors: Jin Lin, Seattle, WA (US); Jason Stewart Wohlgemuth, Seattle, WA (US); Michael Bishop Ebersol, Woodinville, WA (US); Aditya Bhandari, Seattle, WA (US); Steven Adrian West, Redmond, WA (US); Emily Cara Clemens, Snohomish, WA (US); Michael Halstead Kelley, Redmond, WA (US); Dexuan Cui, Sammamish, WA (US); Attilio Mainetti, Bellevue, WA (US); Sarah Elizabeth Stephenson, Boston, MA (US); Carolina Cecilia Perez-Vargas, Seattle, WA (US); Antoine Jean Denis Delignat-Lavaud, Cambridge (GB); Kapil Vaswani, Karnataka (IN); Alexander Daniel Grest, Redmond, WA (US); Steve Michel Pronovost, Redmond, WA (US); David Alan Hepkin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 17/953,169

(22) Filed: Sep. 26, 2022

(65) Prior Publication Data
US 2024/0104193 A1     Mar. 28, 2024

(51) Int. Cl.
G06F 21/53    (2013.01)
G06F 21/60    (2013.01)
(Continued)

(52) U.S. Cl.
CPC ............ *G06F 21/53* (2013.01); *G06F 21/602* (2013.01); *G06F 21/79* (2013.01);
(Continued)

(58) Field of Classification Search
CPC ........... G06F 21/53; G06F 2009/45587; G06F 9/45533; G06F 9/45558; G06F 2009/45595; G06F 11/301
See application file for complete search history.

(56) References Cited

U.S. PATENT DOCUMENTS 9,021,476 B1 *  4/2015  Pratt ....................... G06F 21/53
                                                            718/1
9,135,046 B1 *  9/2015  Pratt ..................... G06F 21/575
(Continued)

OTHER PUBLICATIONS

International Search Report and Written Opinion received for PCT Application No. PCT/US23/030989, (MS# 412046-PCT01) mailed on Nov. 24, 2023, 14 pages.
(Continued)

*Primary Examiner* — Ellen Tran
(74) *Attorney, Agent, or Firm* — Workman Nydegger

(57) ABSTRACT

Methods, systems, and computer program products for direct assignment of physical devices to confidential virtual machines (VMs). At a first guest privilege context of a guest partition, a direct assignment of a physical device associated with a host computer system to the guest partition is identified. The guest partition includes the first guest privilege context and a second guest privilege context, which is restricted from accessing memory associated with the first guest privilege context. The guest partition corresponds to a confidential VM, such that a memory region associated with the guest partition is inaccessible to a host operating system. It is determined, based on a policy, that the physical device is allowed to be directly assigned to the guest partition. Communication between the physical device and the second
(Continued)

guest privilege context is permitted, such as by exposing the physical device on a virtual bus and/or forwarding an interrupt.

19 Claims, 4 Drawing Sheets

(51) Int. Cl.
     *G06F 21/79*     (2013.01)
     *G06F 9/455*     (2018.01)
     *G06F 11/30*     (2006.01)

(52) U.S. Cl.
     CPC ...... *G06F 9/45533* (2013.01); *G06F 9/45558* (2013.01); *G06F 2009/45587* (2013.01); *G06F 2009/45595* (2013.01); *G06F 11/301* (2013.01)

(56) References Cited

U.S. PATENT DOCUMENTS

| | | | |
|---|---|---|---|
| 10,140,139 B1* | 11/2018 | Pratt | G06F 21/62 |
| 2007/0089111 A1* | 4/2007 | Robinson | G06F 9/45545 718/1 |
| 2007/0174897 A1* | 7/2007 | Rothman | G06F 21/80 726/2 |
| 2011/0145916 A1* | 6/2011 | McKenzie | G06F 21/79 718/1 |
| 2013/0061047 A1* | 3/2013 | Sridharan | H04L 45/586 718/1 |
| 2019/0065236 A1* | 2/2019 | Pratt | G06F 9/468 |

OTHER PUBLICATIONS

Jin, et al., "H-SVM: Hardware-Assisted Secure Virtual Machines under a Vulnerable Hypervisor", IEEE Transactions on Computers, vol. 64, Issue 10, Oct. 1, 2015, pp. 2833-2846.

Lim, et al., "Optimizing Nested Virtualization Performance Using Direct Virtual Hardware", ACM Digital Library, Mar. 9, 2020, pp. 557-574.

Yehuda, et al., "The Turtles Project: Design and Implementation of Nested Virtualization", Usenix, The Advanced Computing Systems Association, Sep. 23, 2010, 14 pages.

* cited by examiner

DIRECT ASSIGNMENT OF PHYSICAL DEVICES TO CONFIDENTIAL VIRTUAL MACHINES

BACKGROUND

Hypervisor-based virtualization technologies allocate portions of a computer system's physical resources (e.g., processor cores and/or time, physical memory regions, storage resources, etc.) into separate partitions, and execute software within each of those partitions. Hypervisor-based virtualization technologies therefore facilitate creation of virtual machine (VM) guests that each executes guest software, such as an operating system (OS) and other software executing therein. While hypervisor-based virtualization technologies can take a variety forms, many use an architecture comprising a hypervisor that has direct access to hardware and that operates in a separate execution environment than all other software in the system, a host partition that executes a host OS and host virtualization stack, and one or more guest partitions corresponding to VM guests. The host virtualization stack within the host partition manages guest partitions, and thus the hypervisor grants the host partition a greater level of access to the hypervisor, and to hardware resources, than it does to guest partitions.

Taking HYPER-V from MICROSOFT CORPORATION as one example, the HYPER-V hypervisor is the lowest layer of a HYPER-V stack. The HYPER-V hypervisor provides basic functionality for dispatching and executing virtual processors for VM guests. The HYPER-V hypervisor takes ownership of hardware virtualization capabilities (e.g., second-level address translation (SLAT) processor extensions such as rapid virtualization indexing (RVI) from ADVANCED MICRO DEVICES (AMD), or extended page tables (EPT) from INTEL; an input/output (I/O) memory management unit (IOMMU) that connects a direct memory access-capable I/O bus to main memory; processor virtualization controls). The HYPER-V hypervisor also provides a set of interfaces to allow a HYPER-V host stack within a host partition to leverage these virtualization capabilities to manage VM guests. The HYPER-V host stack provides general functionality for VM guest virtualization (e.g., memory management, VM guest lifecycle management, device virtualization).

Many hypervisor-based virtualization technologies support the direct assignment of a physical device to a VM guest. For example, using discrete device assignment (DDA) technology, the HYPER-V hypervisor enables an entire peripheral component interconnect express (PCIe) device to be passed to VM guest. Direct assignment of physical devices allows high performance access to devices like non-volatile memory express (NVMe) storage or graphics cards from within a VM guest, while enabling the VM guest to leverage the device's native drivers.

In addition to isolating guest partitions from each other, some hypervisor-based virtualization technologies further operate to isolate VM guest state (e.g. registers, memory) from the host partition (and a host OS executing within), and in some cases also from the hypervisor itself. Many of these technologies can also isolate VM guest state from an entity that manages a computing system on which the VM guests are hosted. To achieve the foregoing, these virtualization technologies introduce a security boundary between at least the hypervisor and the host virtualization stack. This security boundary restricts which VM guest resources can be accessed by the host OS (and, in turn, the host virtualization stack) to ensure the integrity and confidentiality of a VM guest. Such a VM guest is referred to herein as a confidential VM (CVM). Examples of hardware-based technologies that enable CVM guests include hardware-based technologies such as software guard extensions (SGX) from INTEL or secure encrypted virtualization secure nested paging (SEV-SNP) from AMD. Software-based CVM guests are also possible.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method including, at a first guest privilege context of a guest partition: identifying a direct assignment of a physical device associated with a host computer system to the guest partition, the guest partition including the first guest privilege context and a second guest privilege context that is restricted from accessing memory associated with the first guest privilege context, wherein a memory region associated with the guest partition is inaccessible to a host OS; determining, based on a policy, that the physical device is allowed to be directly assigned to the guest partition; and permitting communication between the physical device and the second guest privilege context.

In some aspects, the techniques described herein relate to a computer system, including: a processing system; and a computer storage media that stores computer-executable instructions that are executable by the processing system to cause the computer system to at least, at a first guest privilege context of a guest partition: identify a direct assignment of a physical device associated with a host computer system to the guest partition, the guest partition including the first guest privilege context and a second guest privilege context that is restricted from accessing memory associated with the first guest privilege context, wherein a memory region associated with the guest partition is inaccessible to a host OS; determine, based on a policy, that the physical device is allowed to be directly assigned to the guest partition; and permit communication between the physical device and the second guest privilege context.

In some aspects, the techniques described herein relate to a computer program product including a computer storage media that stores computer-executable instructions that are executable by a processing system to cause a computer system to at least, at a first guest privilege context of a guest partition: identify a direct assignment of a physical device associated with a host computer system to the guest partition, the guest partition including the first guest privilege context and a second guest privilege context that is restricted from accessing memory associated with the first guest privilege context, wherein a memory region associated with the guest partition is inaccessible to a host OS; determine, based on a policy, that the physical device is allowed to be directly assigned to the guest partition; and permit communication between the physical device and the second guest privilege context.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
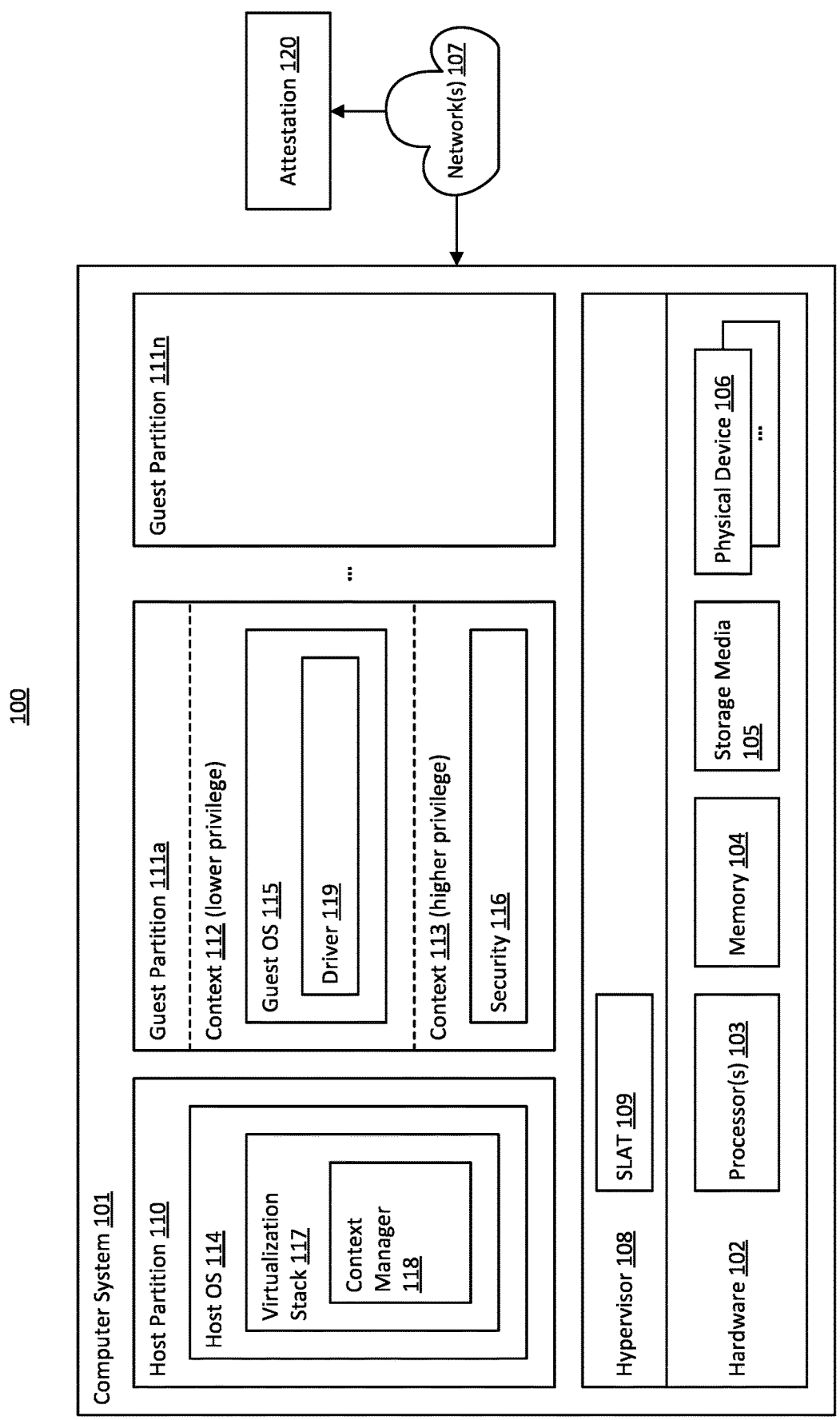
FIG. 1 illustrates an example computer architecture that facilitates secure direct assignment of physical devices to CVMs.

Direct assignment of physical devices to virtual machine (VM) guests, such as using discrete device assignment (DDA) technology, is previously incompatible with confidential VM (CVM) guests. This is because direct assignment of a physical device gives that device access to a VM guest's memory space (e.g., via direct memory access (DMA) technologies). Because physical devices exist outside of a CVM guest's trusted computing base (TCB) (e.g., outside of a security boundary that isolates the CVM from a host OS), and there is no existing capability for a CVM guest to verify the security and authenticity of a physical device, there is presently no mechanism for a CVM guest to ensure that a directly assigned physical device can be trusted to have access to the CVM's memory space. While techniques (e.g., the Trusted Device Interface Security Protocol (TDISP)) are being developed for verifying the security and authenticity of a physical device, those techniques, and devices supporting them, are not yet available.

The embodiments described herein enable direct assignment of untrusted physical devices to a CVM guest in a secure manner. These embodiments create isolated memory contexts within a guest partition corresponding to a CVM guest, including a lower privilege context and a higher privilege context. These embodiments then execute a guest OS within the lower privilege context, and execute a security component within the higher-privileged context. In embodiments, based on the security component identifying the direct assignment of a physical device to the guest partition, the security component determines if a policy allows the physical device to be directly assigned to the guest partition, or if the policy disallows the physical device from being directly assigned to the guest partition. If allowed, the security component permits communication between the physical device and the lower privilege context (and guest OS executing therein); if disallowed, the security component denies such communication. In embodiments, communication between the physical device and the lower privilege context are allowed/disallowed based on controlling exposure of the physical device on a virtual bus used by the lower privilege context and/or by filtering interrupts associated with the physical device.

In embodiments, the security component divides the guest partition's guest physical address (GPA) space into at least a private GPA region and a shared GPA region. The data stored in the private GPA region is encrypted (e.g., by hardware, by the security component) to prevent access to that data by a host OS, while data stored in the shared GPA region is accessible by the host OS. The guest OS sends data to a permitted physical device by writing data to the shared GPA region, and receives data from a permitted physical device by reading from the shared GPA region. In some embodiments, the guest OS encrypts data to be sent to a permitted physical device, and writes the encrypted data to the shared GPA region; and the guest OS decrypts data read from the shared GPA region. In this way, communications between the guest OS and the physical device are isolated from the host OS.

FIG. 1 illustrates an example computer architecture 100 that facilitates secure direct assignment of physical devices to CVMs (e.g., using DDA or similar technologies). As shown, computer architecture 100 includes a computer system 101 comprising hardware 102. Examples of hardware 102 include a processing system comprising processor(s) 103 (e.g., a single processor, or a plurality of processors), memory 104 (e.g., system or main memory), a storage media 105 (e.g., a single computer-readable storage medium, or a plurality of computer-readable storage media), and a physical device 106 (or a plurality of physical devices) for assignment to VM guests. As examples, physical device 106 can comprise a PCIe input/output device such as a network interface, a graphics card, etc. Although not shown, physical device 106 may also include other hardware devices, such as a network interface (e.g., one or more network interface cards) for interconnecting (via a network 107) to one or more other computer systems (e.g., attestation system 120), a trusted platform module (TPM) for facilitating measured boot features, an IOMMU, a video display interface, a user input interface, an external bus, and the like.

As shown, in computer architecture 100, a hypervisor 108 executes directly on hardware 102. In general, the hypervisor 108 partitions hardware resources (e.g., processor(s) 103, memory 104, I/O resources) among a host partition 110 within which a host OS 114 executes, as well as a guest partition 111a within which a guest OS 115 executes. As indicated by ellipses, the hypervisor 108 may partition hardware resources into a plurality of guest partitions 111 (e.g., guest partition 111a to guest partition 111n) that each executes a corresponding guest OS. In the description herein, the term "VM guest" is used to refer to a "guest partition" and the term "CVM guest" is used to indicate when a VM guest is a confidential VM guest operating in an isolated guest partition under an CVM architecture. The hypervisor 108 also enables regulated communications between partitions via a bus (e.g., a VM Bus, not shown). As shown, the host OS 114 includes a virtualization stack 117 which manages VM guest virtualization (e.g., memory management, VM guest lifecycle management, device virtualization) via one or more application program interface (API) calls to the hypervisor 108.

In computer architecture 100, the virtualization stack 117 is shown as including a context manager 118, which divides a guest partition into different privilege zones, referred to herein as guest privilege contexts. Thus, for example, guest partition 111a is shown as comprising guest privilege context 112 (hereinafter, context 112) and guest privilege context 113 (hereinafter, context 113). In embodiments, the context manager 118 can divide any of guest partitions 111 into different guest privilege contexts. As indicted in FIG. 1, in some embodiments context 112 is a lower privilege context (e.g., when compared to context 113), and context 113 is a higher privilege context (e.g., when compared to context 112). In these embodiments, context 112 being lower privilege than context 113 means that context 112 cannot access guest partition memory allocated to context 113. In some embodiments, context 113 can access guest partition memory allocated to context 112. In other embodiments, context 113 lacks access to guest partition memory allocated to context 112.

In some embodiments, context 112 and context 113 are created based on a SLAT 109, which comprises one or more tables that map system physical addresses (SPAs) in memory 104 to GPAs seen by the guest partition 111a. In these embodiments, these mappings prevent context 112 from accessing memory allocated to context 113. In one example, the hypervisor 108 is the HYPER-V hypervisor and uses virtualization-based security (VBS), which uses hardware virtualization features to create and isolate a secure region of memory from an OS, to sub-partition the guest partition 111a into virtual trust levels (VTLs). In this example, context 113 operates under VBS in a higher privileged VTL, and context 112 operates under VBS in a lower privileged VTL. In other embodiments, context 112 and context 113 are created based on nested virtualization, in which guest partition 111a operates a hypervisor that, similar to hypervisor 108, partitions resources of guest partition 111a into sub-partitions. In these embodiments, this hypervisor operating within guest partition 111a prevents context 112 from accessing memory allocated to context 113.

In FIG. 1, context 113 is shown as including a security component 116. In embodiments, the security component 116 runs within each CVM that is configured to use the direct device assignment techniques described herein. Because the security component 116 operates within the guest partition 111a, in embodiments, security component 116 is therefore part of a CVM guest's TCB, and is measured as part of the CVM guest's initial image.

In some embodiments, context 113 operates as a host compatibility layer (HCL) firmware environment that provides a set of facilities, such as virtualized TPM support, to a guest OS running within context 112. In these embodiments, the security component 116 is part of this HCL firmware environment, and provides direct device assignment facilities. In some embodiments, operation of the security component 116 within context 113 is transparent to the guest OS 115, while in other embodiments the guest OS 115 is enlightened to be aware of security component 116 and the facilities it offers.

Figure 2:
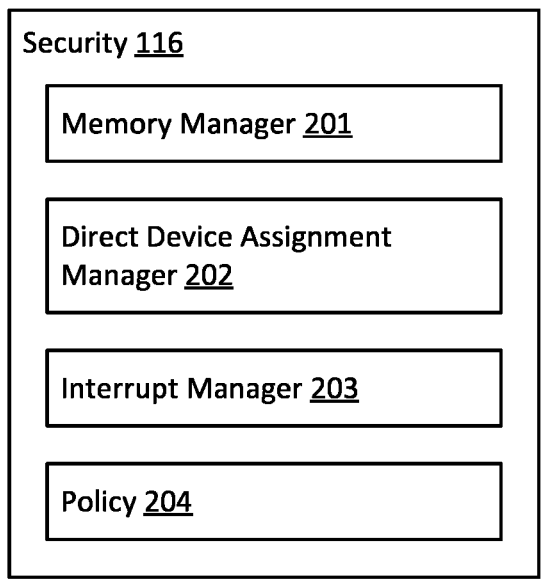
FIG. 2 illustrates an example of internal elements of a security component that facilitates direct assignment of physical devices to CVMs.

FIG. 2 illustrates an example 200 of internal elements of the security component 116 of FIG. 1. Each internal element of the security component 116 depicted in FIG. 2 represents various functionalities that the security component 116 might implement in accordance with various embodiments described herein. It will be appreciated, however, that the depicted elements—including their identity and arrangement—are presented merely as an aid in describing example embodiments of the security component 116.

In embodiments, the security component 116 operates within the context of a guest partition that is configured as a CVM guest (e.g., guest partition 111a). CVM guests can be created using hardware-based technologies, such as SGX from INTEL or SEV-SNP from AMD, and/or software-based technologies. Additionally, as described, in embodiments, the security component 116 operates within a higher-privileged context of the CVM guest (e.g., context 113), such as a context created based on mappings within a SLAT table, or using nested virtualization.

In some embodiments, the security component 116 includes a memory manager 201, which operates to divide the CVM guest's GPA space into at least a private GPA region and a shared GPA region. The guest OS 115 sends data to a physical device 106 by writing data to the shared GPA region, and receives data from the physical device 106 by reading from the shared GPA region.

In some embodiments, the guest OS 115 encrypts data to be sent to the physical device 106, and writes the encrypted data to the shared GPA region. Additionally, the guest OS 115 decrypts data read from the shared GPA region. In these embodiments, the physical device 106 includes functionality for encrypting and decrypting this data. In this way, communications between the guest OS 115 and the physical device 106 are isolated from the host OS 114.

Figure 3:
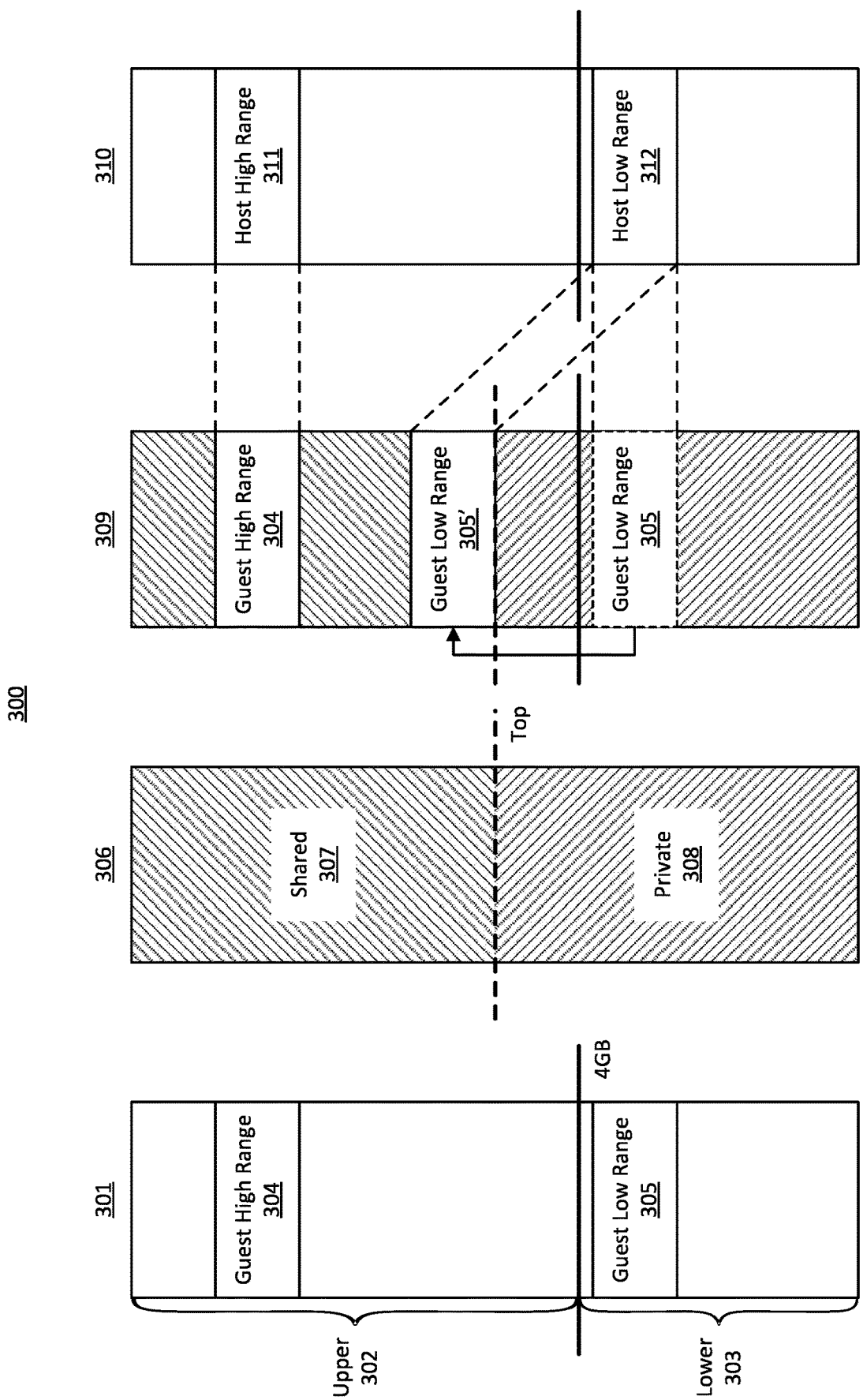
FIG. 3 illustrates an example of dividing a CVM guest's memory into shared and private regions.

FIG. 3 illustrates an example 300 of dividing a CVM guest's memory into shared and private regions. Initially, example 300 shows an example of a VM GPA space 301. As will be appreciated, conventional 32-bit memory addresses can address $2^{32}$ bytes (or 4 GB) of memory, while modern 64-bit memory addresses can address $2^{64}$ bytes of memory. Thus, VM GPA space 301 shows a 4 GB memory boundary that defines a lower memory region 303 that is accessible using 32-bit addressing (as well as 64-bit addressing), and an upper memory region 302 that is accessible using 64-bit addressing. As will also be appreciated, defined regions of a memory space are often used for communicating with physical devices via DMA, or to provide a CPU access to device control registers. Thus, VM GPA space 301 shows a guest device low range 305 within the lower memory region 303 (e.g., for communicating with physical devices that use 32-bit memory addressing), and a guest device high range 304 within the upper memory region 302 (e.g., for communicating with physical devices that use 64-bit memory addressing).

Example 300 also shows an example of a divided memory space 306, in which an upper region of the divided memory space 306 is a shared region 307 (denoted by right-slanted lines), and a lower upper region of the divided memory space 306 is a private region 308 (denoted by left-slanted lines). In embodiments, a divided memory space 306 is created by the memory manager 201 based on use of hardware-based technologies. For example, some embodiments use virtual machine privilege levels (VMPLs) from AMD to define a virtual top of memory (vTOM) to logically partition memory into a region that is private (and, thus, accessible only to the CVM) and a region that is shared (and, thus, also accessible to a host partition). Other embodiments use memory page flags to indicate which memory pages are private (and, thus, accessible only to the CVM) versus shared (and, thus, also accessible to a host partition).

Combining VM GPA space 301 and divided memory space 306, example 300 also includes a CVM GPA space 309, in accordance with the embodiments herein. In CVM GPA space 309, right-slanted and left-slanted lines indicate that the CVM GPA space 309 includes a shared region 307 and a private region 308. Additionally, as indicated by a solid horizontal line, the CVM GPA space 309 also includes an upper memory region 302 and a lower memory region 303 defined by 32-bit versus 64-bit addressing. Because, in example 300, the guest device low range 305 resides within the private region 308, in embodiments, the memory manager 201 maps the guest device low range 305 into the shared region 307 as guest device low range 305'. This enables a guest OS to communicate with a directly-assigned physical device that expects to use the guest device low range 305 via shared memory, rather than private memory. In alterative examples, the guest device high range 304 also resides within the private region 308, and the memory manager 201 also maps the guest device high range 304 into the shared region 307.

Example 300 also shows a partial mapping between CVM GPA space 309 and a SPA space 310. As shown, GPAs in the guest device high range 304 are mapped to SPAs in a host device high range 311 of the SPA space 310. Additionally, GPAs in the guest device low range 305 and the guest device low range 305' are doubly-mapped to SPAs in a host device low range 312 of the SPA space 310. With this double-mapped configuration, a driver 119 within the guest OS 115 can use GPAs within the guest device low range 305' to communicate with a physical device mapped to the host device low range 312.

The security component 116 also includes a direct device assignment manager 202, which identifies the direct assignment (e.g., by the virtualization stack 117) of a physical device 106 to guest partition 111a. Based on this identification, the direct device assignment manager 202 determines if policy 204 allows this physical device 106 to be directly assigned to the guest partition 111a, or if such assignment is disallowed. In some embodiments, the policy 204 includes an allow list of one or more physical devices that are permitted to be directly assigned to the guest partition 111a. Additionally, or alternatively, in some embodiments the policy 204 includes a deny list of one or more physical devices that not permitted to be directly assigned to the guest partition 111a. In some embodiments, the policy 204 resides at context 113. In other embodiments, the policy 204 resides at an attestation system 120, and the direct device assignment manager 202 communicates with the attestation system 120 to determine if a particular physical device is permitted to be directly assigned to the guest partition 111a. In embodiments, the policy 204 identifies allowed or disallowed devices based on a device type (e.g., graphics card, network interface card), a model identifier, a vendor identifier (e.g., a PCIe vendor identifier), a device identifier (e.g., a PCIe device identifier), and the like.

In embodiments, if the direct device assignment manager 202 determines that the physical device 106 is permitted by policy 204 to be directly assigned to the guest partition 111a, then the direct device assignment manager 202 permits communication between the physical device 106 and context 112 (and guest OS 115 executing therein). Conversely, in embodiments, if the direct device assignment manager 202 determines that the physical device 106 is not permitted by policy 204 to be directly assigned to the guest partition 111a, then the direct device assignment manager 202 denies such communication.

In some embodiments, the direct device assignment manager 202 permits communication between the physical device 106 and context 112 based on exposing the physical device 106 on a virtual bus that is utilized by context 112, and denies such communication by blocking the physical device 106 from the virtual bus (e.g., by omitting the physical device 106 from the virtual bus).

Additionally, or alternatively, in some embodiments, the direct device assignment manager 202 permits or denies communication between the physical device 106 and context 112 based on using an interrupt manager 203 to filter interrupts. For example, when the interrupt manager 203 intercepts an interrupt associated with the physical device 106 (e.g., an interrupt originating from the physical device 106, or an interrupt directed to the physical device 106), the interrupt manager 203 forwards that interrupt towards its destination if the physical device 106 is permitted to be directly assigned to the guest partition 111a, or blocks the interrupt if the physical device 106 is not permitted to be directly assigned to the guest partition 111a.

The components of the security component 116 are now described in connection with FIG. 4, which illustrates a flow chart of an example method 400 for securely managing the direct assignment of a physical device to a CVM. In embodiments, instructions for implementing method 400 are encoded as computer-executable instructions (e.g., context manager 118, security component 116) stored on a computer storage media (e.g., storage media 105) that are executable by a processor (e.g., processor(s) 103) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Initially, it is noted that, in embodiments, method 400 is performed within the context of a guest partition that is configured as a CVM guest. This means that a memory region associated with the guest partition is inaccessible to a host OS. For example, a memory region associated with guest partition 111a is inaccessible to host OS 114. In embodiments, this memory region associated with the guest partition is inaccessible to the host OS based on at least one of a mapping within a SLAT table, or encryption of contents of the memory region.

Figure 4:
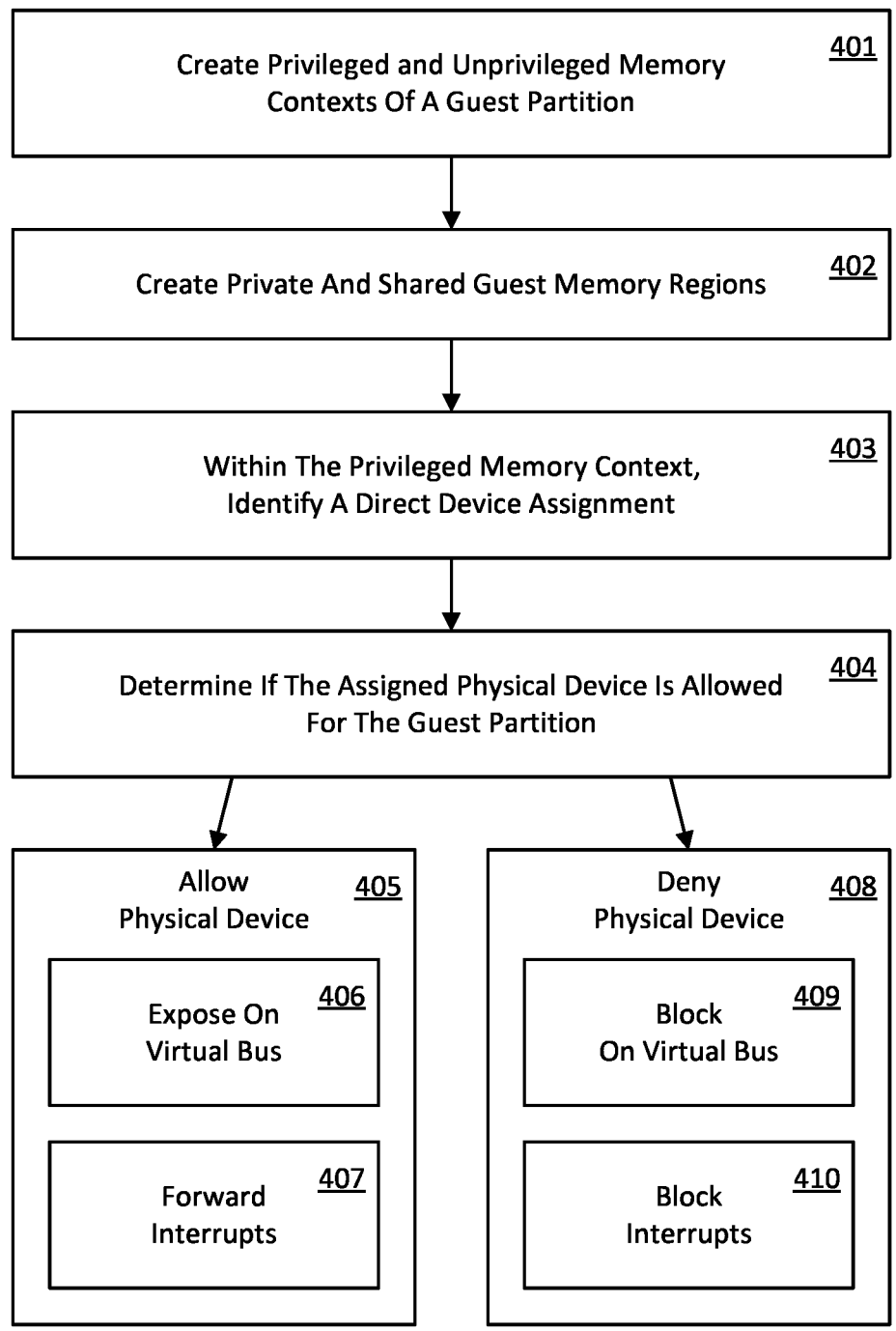
FIG. 4 illustrates a flow chart of an example method for securely managing the direct assignment of a physical device to a CVM.

Referring to FIG. 4, in embodiments, method 400 comprises an act 401 of creating privileged and unprivileged memory contexts of a guest partition. In some embodiments, act 401 comprises, creating a first guest privilege context and a second guest privilege context of a guest partition, wherein the second guest privilege context is restricted from accessing memory associated with the first guest privilege context. In an example, the context manager 118 creates context 112 and context 113 of guest partition 111a using SLAT mappings, or by configuring the guest partition 111a to use nested virtualization. By creating these different guest privilege contexts, act 401 configures a CVM to be able to run security component 116 in a manner that is isolated from the guest OS 115, and that is potentially even transparent to the guest OS 115.

In embodiments, method 400 also comprises an act 402 of creating private and shared guest memory regions. In some embodiments, act 402 comprises, at the first guest privilege context, partitioning a guest physical address space of the guest partition into a private physical address space region and a shared physical address space region. In an example, the memory manager 201 partitions a GPA space associated with guest partition 111a to include a shared region 307 and a private region 308, such as in the manner shown in CVM GPA space 309. This provides the guest OS 115 with a memory region (i.e., shared region 307) with which it can communicate with host OS 114 and physical device 106, and a memory region (i.e., private region 308) that is isolated from the host OS 114 and the physical device 106.

In embodiments, the memory manager 201 isolates contents of memory within the private region 308 from the host OS 114 based on encrypting and decrypting those contents on behalf of the guest OS 115. Thus, in some embodiments, method 400 comprises, at the first guest privilege context, encrypting writes, by the second guest privilege context, to the private physical address space region; and decrypting reads, by the second guest privilege context, from the private physical address space region.

As illustrated in FIG. 3, in some embodiments the memory manager 201 maps a device memory region (guest device low range 305) into the shared region 307 of the CVM GPA space 309 (guest device low range 305'). As shown, in FIG. 3, this is accomplished by double-mapping SPAs to GPAs. Thus, in some embodiments, method 400 comprises, at the first guest privilege context, mapping a device memory region (e.g., host device low range 312) within a host physical address space (e.g., SPA space 310) of the host computer system to each of the private physical address space region (e.g., guest device low range 305 within private region 308) and the shared physical address space region (e.g., guest device low range 305' within shared region 307).

In embodiments, method 400 also comprises an act 403 of, within the privileged memory context, identifying a direct device assignment. In some embodiments, act 403 comprises, at the first guest privilege context, identifying a direct assignment of a physical device associated with a host computer system to the guest partition. In an example, the direct device assignment manager 202 identifies assignment (e.g., by virtualization stack 117, using DDA technology, or similar) of physical device 106 to guest partition 111a.

In embodiments, method 400 also comprises an act 404 of determining if the assigned physical device is allowed for the guest partition. In some embodiments, act 404 comprises, at the first guest privilege context, determining, based on a policy, that the physical device is allowed to be directly assigned to the guest partition. In an example, based on the direct device assignment manager 202 consulting policy 204 (and/or consulting attestation system 120), the direct device assignment manager 202 determines that the policy 204 permits the physical device 106 to be directly assigned to the guest partition 111a.

In other embodiments, act 404 comprises, at the first guest privilege context, determining, based on the policy, that the physical device is not allowed to be directly assigned to the guest partition. In an example, based on the direct device assignment manager 202 consulting policy 204 (and/or consulting attestation system 120), and the direct device assignment manager 202 determines that that the policy 204 does not permit the physical device 106 to be directly assigned to the guest partition 111a.

In embodiments, the policy 204 identifies the physical device 106 as allowed (or denied) based on one or more of a device type, a model identifier, a vendor identifier, or a device identifier.

Depending on the outcome of act 404, method 400 also comprises either an act 405 of allowing the physical device (e.g., when the direct device assignment manager 202 determines that physical device 106 is allowed to be directly assigned to guest partition 111a), or an act 408 of denying the physical device (e.g., when the direct device assignment manager 202 determines that physical device 106 is not allowed to be directly assigned to guest partition 111a).

When method 400 comprises act 405, in some embodiments, act 405 comprises, at the first guest privilege context, permitting communication between the physical device and the second guest privilege context. In an example, based on determining in act 404 that physical device 106 is allowed to be directly assigned to the guest partition 111a, the direct device assignment manager 202 permits communications between the physical device 106 and the context 112. As shown, act 405 can include one or more of an act 406 of exposing the physical device on a virtual bus, or an act 407 of forwarding physical device interrupts.

When method 400 comprises act 406, in some embodiments, act 406 comprises exposing the physical device on a virtual bus used by the second guest privilege context. In an example, the direct device assignment manager 202 exposes physical device 106 on a virtual bus used by context 112. This enables the guest OS 115 to discover and utilize the device (e.g., using driver 119). In embodiments, exposing the physical device on a virtual bus includes exposing an identifier (e.g., a PCI ID) of the physical device 106 on the virtual bus, mapping the physical device to a portion of a memory space of the guest partition, etc.

Additionally, or alternatively, in some embodiments, act 407 comprises intercepting an interrupt associated with the physical device, and forwarding the interrupt towards an interrupt destination. In an example, the interrupt manager 203 intercepts an interrupt associated with the physical device 106 (e.g., originating from the physical device 106, or directed to the physical device 106), and forwards that interrupt towards its destination (e.g., by triggering the interrupt at the destination). In some embodiments, the interrupt is initiated by the guest OS 115 operating at the second guest privilege context (context 112), and forwarding the interrupt to the interrupt destination comprises forwarding the interrupt towards the physical device 106. This enables the physical device 106 to receive interrupts initiated by the guest OS 115. In other embodiments, the interrupt is initiated by the physical device 106, and forwarding the interrupt to the interrupt destination comprises forwarding the interrupt towards the second guest privilege context (context 112). This enables the guest OS 115 to receive interrupts initiated by the physical device 106.

In some embodiments, when communication between the physical device and the second guest privilege context is permitted, the guest OS and the physical device rely on encrypted communications via the shared region 307, in order to isolate their communications from the host OS 114. Thus, in embodiments, method 400 comprises, at the second guest privilege context, sending data to the physical device based on encrypting the data to generate encrypted data, and writing the encrypted data to the shared physical address space region. Additionally, in embodiments, method 400 comprises, at the second guest privilege context, receiving data from the physical device based on reading encrypted data from the shared physical address space region to generate unencrypted data.

In some embodiments, act 408 comprises, at the first guest privilege context, denying communication between the physical device and the second guest privilege context. In an example, based on determining in act 404 that physical device 106 is not allowed to be directly assigned to the guest partition 111a, the direct device assignment manager 202 denies communications between the physical device 106 and the context 112. As shown, act 408 can include one or more of an act 409 of blocking the physical device on a virtual bus, or an act 410 of blocking physical device interrupts.

In some embodiments, act 409 comprises blocking the physical device on a virtual bus used by the second guest privilege context. In an example, the direct device assignment manager 202 blocks physical device 106 from a virtual bus used by context 112. This prevents the guest OS 115 from discovering and utilizing the device.

Additionally, or alternatively, in some embodiments, act 410 comprises intercepting an interrupt associated with the physical device, and blocking the interrupt. In an example, the interrupt manager 203 intercepts an interrupt associated with the physical device 106 (e.g., originating from the physical device 106, or directed to the physical device 106), and blocks that interrupt. This ensures that there can be no communication between the physical device 106 and the guest OS 115.

Based on method 400, the security component 116 enables physical devices to be securely assigned to a CVM based on use of a policy, with the CVM itself determining whether or not to allow the direct device assignment. Additionally, by utilizing encrypted communications, a CVM and a physical device can communicate in isolation from a host OS.

Embodiments of the disclosure may comprise or utilize a special-purpose or general-purpose computer system (e.g., computer system 101) that includes computer hardware, such as, for example, a processor system (e.g., processor(s) 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked through a network, each perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented in a host computer system that includes a processor, for securely assigning a direct memory access (DMA) physical device associated with the host computer system to a confidential virtual machine (VM) executing at the host computer system, comprising:
    creating a guest partition at the host computer system, the guest partition corresponding to a confidential VM and comprising a first guest privilege context and a second guest privilege context, wherein the second guest privilege context executes a guest operating system (OS) and is restricted from accessing memory associated with the first guest privilege context; and
    in the first guest privilege context, enabling DMA access by the confidential VM to the physical device, including:
        partitioning a guest physical address space of the guest partition into a private physical address space region that is inaccessible by a host OS of the host computer system and a shared physical address space region that is accessible by the host OS;
        identifying a direct assignment of the physical device to the guest partition;
        determining, based on a policy, that the physical device is allowed to be directly assigned to the guest partition and to be accessible to the guest partition via DMA;
        exposing the physical device on a virtual bus used by the second guest privilege context; and
        facilitating communication between the physical device and the second guest privilege context via the shared physical address space region, including forwarding interrupts between the guest OS and the physical device.

2. The method of claim 1, wherein permitting communication between the physical device and the second guest privilege context comprises exposing the physical device on a virtual bus used by the second guest privilege context.

3. The method of claim 1, wherein permitting communication between the physical device and the second guest privilege context comprises:
    intercepting an interrupt associated with the physical device; and
    forwarding the interrupt towards an interrupt destination.

4. The method of claim 3, wherein:
    the interrupt is initiated by the guest OS operating at the second guest privilege context; and
    forwarding the interrupt to the interrupt destination comprises forwarding the interrupt towards the physical device.

5. The method of claim 3, wherein:
    the interrupt is initiated by the physical device; and
    forwarding the interrupt to the interrupt destination comprises forwarding the interrupt towards the second guest privilege context.

6. The method of claim 1, wherein a memory region associated with the guest partition is inaccessible to the host OS based on at least one of:
    a mapping within a second-level address translation table; or
    encryption of contents of the memory region.

7. The method of claim 1, wherein the private physical address space region is inaccessible by the host OS based on the first guest privilege context:
    encrypting writes, by the second guest privilege context, to the private physical address space region; and
    decrypting reads, by the second guest privilege context, from the private physical address space region.

8. The method of claim 1, further comprising, at the second guest privilege context, sending data to the physical device based on:
    encrypting the data to generate encrypted data; and
    writing the encrypted data to the shared physical address space region.

9. The method of claim 1, further comprising, at the first guest privilege context, mapping a device memory region within a host physical address space of the host computer system to each of the private physical address space region and the shared physical address space region.

10. The method of claim 1, wherein the policy identifies the physical device as allowed based on one or more of a device type, a model identifier, a vendor identifier, or a device identifier.

11. The method of claim 1, wherein the physical device is a first physical device, the method further comprising, at the first guest privilege context:
    identifying a direct assignment of a second physical device associated with the host computer system to the guest partition;
    determining, based on the policy, that the second physical device is not allowed to be directly assigned to the guest partition; and
    denying communication between the second physical device and the second guest privilege context.

12. The method of claim 11, wherein denying communication between the second physical device and the second guest privilege context comprises blocking the second physical device on a virtual bus used by the second guest privilege context.

13. The method of claim 11, wherein denying communication between the second physical device and the second guest privilege context comprises:
   intercepting an interrupt associated with the second physical device; and
   blocking the interrupt.

14. A computer system, comprising:
   a processing system;
   a direct memory access (DMA) physical device; and
   a computer storage media that stores computer-executable instructions that are executable by the processing system to cause a guest partition corresponding to a confidential virtual machine (VM) to:
      at a first guest privilege context of the guest partition:
         partition a guest physical address space of the guest partition into a private physical address space region that is inaccessible by a host operating system (OS) of the computer system and a shared physical address space region that is accessible by the host OS;
         identify a direct assignment of the DMA physical device to the guest partition;
         determine, based on a policy, that the physical device is allowed to be directly assigned to the guest partition and to be accessible to the guest partition via DMA;
         expose the physical device on a virtual bus used by a second guest privilege context of the guest partition; and
         facilitate communication between the physical device and the second guest privilege context, via the shared physical address space region, including forwarding interrupts between the guest OS and the physical device,
      wherein the second guest privilege context executes a guest OS and is restricted from accessing memory associated with the first guest privilege context.

15. The computer system of claim 14, wherein permitting communication between the physical device and the second guest privilege context, also includes:
   intercepting an interrupt associated with the physical device; and
   forwarding the interrupt towards an interrupt destination.

16. The computer system of claim 14, the computer-executable instructions also including instructions that are executable by the processing system to cause the computer system to at least, at the first guest privilege context:
   partition a guest physical address space of the guest partition into a private physical address space region and a shared physical address space region.

17. The computer system of claim 16, the computer-executable instructions also including instructions that are executable by the processing system to cause the computer system to at least, at the first guest privilege context, map a device memory region within a host physical address space of the host computer system to each of the private physical address space region and the shared physical address space region.

18. A computer program product comprising a computer storage media that stores computer-executable instructions that are executable by a processing system of a host computer system to cause a guest partition corresponding to a confidential virtual machine (VM) to:
   at a first guest privilege context of the guest partition:
   partition a guest physical address space of the guest partition into a private physical address space region that is inaccessible by a host operating system (OS) of the computer system and a shared physical address space region that is accessible by the host OS;
   identify a direct assignment of direct memory access (DMA) physical device associated with the host computer system to the guest partition;
   determine, based on a policy, that the physical device is allowed to be directly assigned to the guest partition and to be accessible to the guest partition via DMA;
   expose the physical device on a virtual bus used by a second guest privilege context of the guest partition; and
   facilitate communication between the physical device and the second guest privilege context via the shared physical address space region, including:
      intercepting an interrupt associated with the physical device; and
      forwarding the interrupt towards an interrupt destination,
   wherein the second guest privilege context executes a guest OS and is restricted from accessing memory associated with the first guest privilege context.

19. The computer program product of claim 18, wherein permitting communication between the physical device and the second guest privilege context, also includes exposing the physical device on a virtual bus used by the second guest privilege context.

* * * * *